United States Patent [19]

Haber et al.

[11] Patent Number: 5,774,856
[45] Date of Patent: Jun. 30, 1998

[54] USER-CUSTOMIZED, LOW BIT-RATE SPEECH VOCODING METHOD AND COMMUNICATION UNIT FOR USE THEREWITH

[75] Inventors: William Joe Haber, Tempe; George Thomas Kroncke, Gilbert; William George Schmidt, Sun Lakes; Martin John O'Sullivan, Scottsdale, all of Ariz.

[73] Assignee: Motorola, Inc., Schaumburg, Ill.

[21] Appl. No.: 537,583

[22] Filed: Oct. 2, 1995

[51] Int. Cl.$^6$ ..................................................... G10L 3/02
[52] U.S. Cl. ........................ 704/270; 704/270; 704/201; 379/56.1; 379/88; 379/89
[58] Field of Search ..................... 375/2.79, 2.28–2.33, 375/2.09, 2.1; 379/58–63, 84–92.02; 704/270, 219–224, 201

[56] References Cited

U.S. PATENT DOCUMENTS

| | | | |
|---|---|---|---|
| 5,117,460 | 5/1992 | Berry et al. | 395/2.84 |
| 5,276,686 | 1/1994 | Ito | 370/330 |
| 5,392,282 | 2/1995 | Kiema | 370/491 |
| 5,416,779 | 5/1995 | Barnes et al. | 370/280 |
| 5,455,863 | 10/1995 | Brown et al. | 380/23 |
| 5,457,732 | 10/1995 | Goldberg | 379/201 |
| 5,490,284 | 2/1996 | Itoh et al. | 455/11.1 |
| 5,515,397 | 5/1996 | Wiorek | 345/216 |
| 5,550,543 | 8/1996 | Chen et al. | 341/94 |
| 5,572,622 | 11/1996 | Wigren et al. | 704/228 |
| 5,596,676 | 1/1997 | Swaminathan et al. | 704/208 |
| 5,606,550 | 2/1997 | Jangi | 370/289 |
| 5,654,942 | 8/1997 | Akahane | 704/504 |
| 5,666,357 | 9/1997 | Jangi | 370/345 |
| 5,701,390 | 12/1997 | Griffin et al. | 704/206 |
| 5,706,282 | 1/1998 | Chung | 370/280 |

OTHER PUBLICATIONS

Jack et al, "Design and evaluation of Automated telephone Services", IEE Colloq. (1992), No. 114, telecommunications, Consumer, and Industrial.

Li et al, "Voice/Data Channel Access Integration in TDMA Digital Cellular Networks", IEEE Transactions on Vehicular Technology, Nov. 1994.

Clissmann et al, "Security for Mobile Users of Telecommunication Services", Universal Personal Communications, 1994, 3rd Int'l Conference.

Phamdo et al, "Source–dependent channel coding of CELP speech over Land Mobile Radio Channels", MILCOM '95, Universal Communications, Conference Record, 1995.

Primary Examiner—David R. Hudspeth
Assistant Examiner—Michael N. Opsasnick
Attorney, Agent, or Firm—Sherry J. Whitney

[57] ABSTRACT

A voice encoding method [and apparatus initialize] initializes (160) transmit and receive vocoders operated within communication units (12, 42) with a user-unique speech characteristic model (SCM) table (320) and an input stimulus table (340). The SCM table (320) and input stimulus table (340) are created during a training task (120) and stored (144) in a user information card (360), within a communication unit (60), or at a control facility (90). During call setup, the tables are exchanged (180) between the transmit and receive vocoders and the user's speech is encoded (200) using the SCM table (320) and input stimulus table (340). During encoding (200), either compressed table entries that most closely match the input speech, or indexes that identify the closest table entries are sent (220) in a bitstream to the receive vocoder. The SCM table (320) and input stimulus table (340) can be updated (240) during or after the call.

30 Claims, 10 Drawing Sheets

| ADDRESS | UIC VOCODER DATA |
|---|---|
| 0000 | USER ID FIELD |
| 0001 | SCM 1 |
| 0011 | SCM 2 |
| 0021 | SCM 3 |
| ⋮ | ⋮ |
| 1000 | INPUT STIMULUS ENTRY 1 |
| 1010 | INPUT STIMULUS ENTRY 2 |
| 1020 | INPUT STIMULUS ENTRY 3 |
| ⋮ | ⋮ |

| USER ID | ENTRY INDEX | SPEECH CAVITY PARAMETERS |
|---|---|---|
| 1 | 1 | 7 10 12 15 . . . |
| 1 | 2 | 8 9 11 17 . . . |
| 1 | 3 | 2 14 3 6 . . . |
| 1 | 4 | . . . |
| ⋮ | ⋮ | |
| 2 | 1 | |
| 2 | 2 | |
| 2 | 3 | |
| 2 | 4 | |
| ⋮ | ⋮ | |
| 3 | 1 | |
| 3 | 2 | |
| ⋮ | ⋮ | |

*FIG. 10*

| USER ID | ENTRY INDEX | STIMULUS CAVITY PARAMETERS |
|---|---|---|
| 1 | 1 | 70 77 40 21 . . . |
| 1 | 2 | 4 0 16 154 . . . |
| 1 | 3 | 1024 882 615 . . . |
| 1 | 4 | . . . |
| ⋮ | ⋮ | |
| 2 | 1 | |
| 2 | 2 | |
| 2 | 3 | |
| 2 | 4 | |
| ⋮ | ⋮ | |
| 3 | 1 | |
| 3 | 2 | |
| ⋮ | | |

*FIG. 11*

preferred embodiment of the present invention;

USER-CUSTOMIZED, LOW BIT-RATE SPEECH VOCODING METHOD AND COMMUNICATION UNIT FOR USE THEREWITH

FIELD OF THE INVENTION

The present invention relates generally to encoding speech, and more particularly to encoding speech at low bit rates using lookup tables.

BACKGROUND OF THE INVENTION

Vocoders compress and decompress speech data Their purpose is to reduce the number of bits required for transmission of intelligible digitized speech. Most vocoders include an encoder and a decoder. The encoder characterizes frames of input speech and produces a bitstream for transmission to the decoder. The decoder receives the bitstream and simulates speech from the characterized speech information contained in the bitstream. Simulated speech quality typically decreases as bit rates decrease because less information about the speech is transmitted.

With CELP-type ("Code Excited Linear Prediction") vocoders, the encoder estimates a speaker's speech characteristics, and calculates the approximate pitch. The vocoder also characterizes the "residual" underlying the speech by comparing the residual in the speech frame with a table containing pre-stored residual samples. An index to the closest-fitting residual sample, coefficients describing the speech characteristics, and the pitch are packed into a bitstream and sent to the decoder. The decoder extracts the index, coefficients, and pitch from the bitstream and simulates the frame of speech.

Computational methods employed by prior-art vocoders are typically user independent. Regardless of who the speaker is, the vocoder uses the same table and executes the same algorithm. In CELP-type vocoders, white noise codebooks can be optimized for a particular language, but are not optimized for a particular speaker.

What is needed is a method and apparatus for low bit-rate vocoding which provides higher quality speech. Particularly needed is a user-customized voice coding method and apparatus which allows low-bit rate speech characterization.

BRIEF DESCRIPTION OF THE DRAWINGS

FIG. 10 illustrates a speech characteristic model table in accordance with a preferred embodiment of the present invention;

FIG. 11 illustrates an uncompressed input stimulus table in accordance with a preferred embodiment of the present invention.

DETAILED DESCRIPTION OF THE DRAWINGS

The method and apparatus of the present invention provide a low bit-rate vocoder which produces high quality transmitted speech. The vocoder of the present invention uses a pre-stored speech characteristic model (SCM) table and input stimulus table containing entries from a registered user. As used herein, the term "registered user" means a user who has an SCM table and an input stimulus table pre-stored in the system. The term is not meant to refer to user registration for the purposes of billing.

The SCM table and input stimulus table are stored within a communication unit (CU) or in an external storage device (e.g., a User Information Card or a control facility memory device). As used herein, a "transmit vocoder" is a vocoder that is encoding speech samples and a "receive vocoder" is a vocoder that is decoding the speech The transmit vocoder or the receive vocoder can be located within a CU or in a control facility that provides service to telephones which do not have vocoder equipment.

During call setup, the SCM table and input stimulus table for the transmit vocoder user are sent to the receive vocoder to be used in the decoding process. During the call, the speech from the transmit vocoder user is characterized by determining table entries which most closely match the user's speech. Information describing these table entries is sent to the receive vocoder. Because the method and apparatus utilize user-customized tables, speech quality is enhanced. In addition, the use of tables allows the characterised speech to be transmitted at a low bit rate. Although the method and apparatus of the present invention are described using SCM tables and input stimulus tables, other user-customized tables used to characterize speech are encompassed within the scope of the description and claims.

Figure 1:
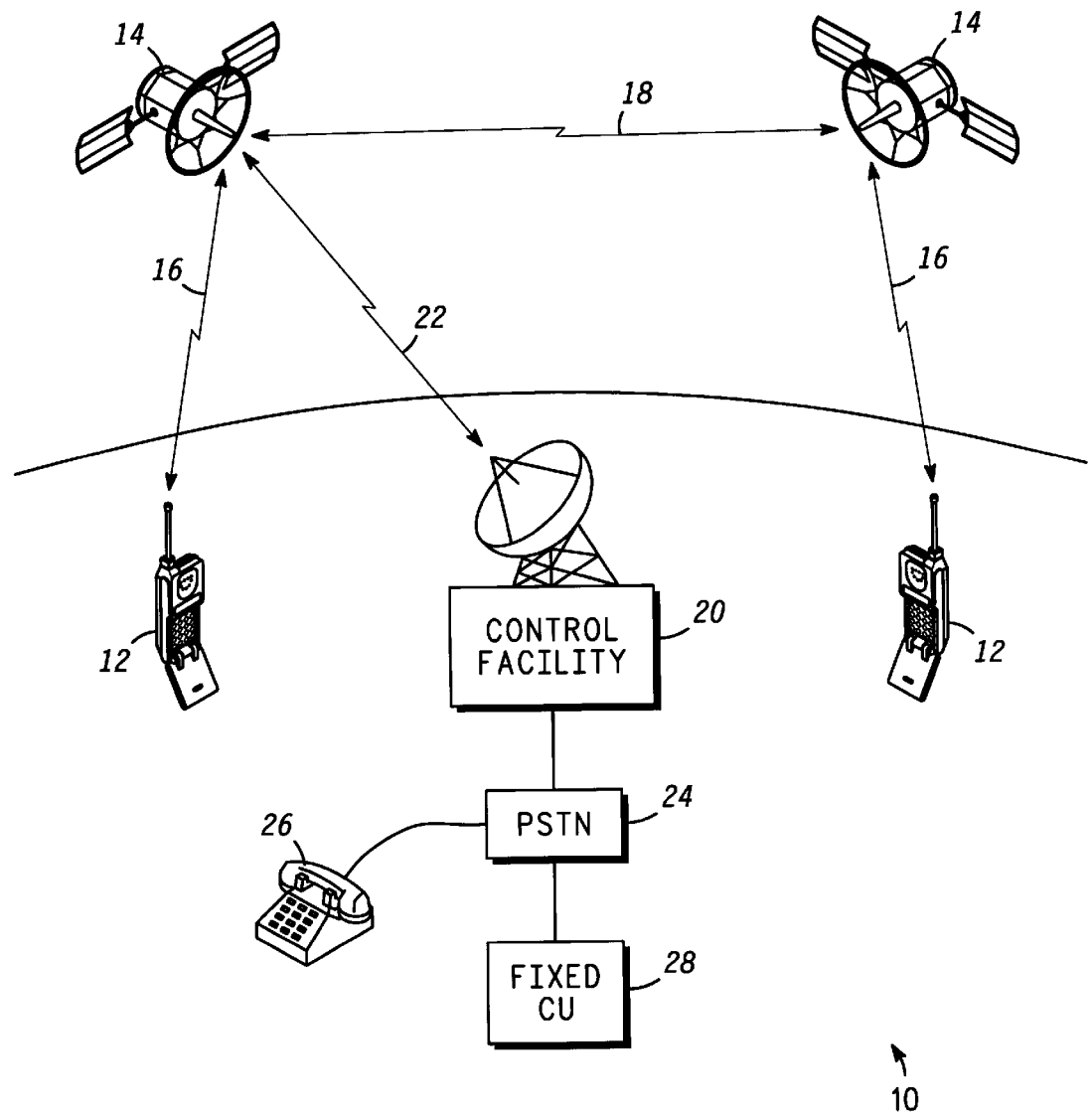
FIG. 1 illustrates a communication system in accordance with a preferred embodiment of the present invention.

FIG. 1 illustrates communication system 10 in accordance with a preferred embodiment of the present invention. Communication system 10 includes Mobile Communication Units 12 (MCUs), satellites 14, Control Facility 20 (CF), Public Switched Telephone Network 24 (PSTN), conventional telephone 26, and Fixed CU 28 (FCU). As used herein, where both MCUs 12 and FCUs 28 perform the same functions, the general term Communication Unit (CU) will be used.

MCUs 12 can be, for example, cellular telephones or radios adapted to communicate with satellites 14 over radiofrequency (RF) links 16. FCUs 28 can be telephone units linked directly with PSTN 24 which have attached or portable handsets. Unlike conventional telephone 26, CUs 12, 28 include vocoder devices for compressing speech data. In a preferred embodiment, CUs 12, 28 also include a User Information Card (UIC) interface. This interface allows a CU user to swipe or insert a UIC containing information unique to the user. A UIC can be, for example, a magnetic strip card. As described further in conjunction with FIGS.

10–12, the UIC contains one or more user identification numbers, SCM tables, and input stimulus tables which are loaded into the vocoding process. By using a UIC, a user can load his or her vocoding information into any CU. CUs 12, 28 are described in more detail in conjunction with FIG. 3.

Satellites 14 can be low-earth, medium-earth, or geostationary satellites. In a preferred embodiment, satellites 14 are low-earth orbit satellites which communicate with each other over link 18. Thus, a call from a first CU 12, 28 that is serviced by a first satellite 14 can be routed directly through one or more satellites over links 18 to a second CU 12,28 serviced by a second satellite 14. In an alternate embodiment, satellites 14 may be part of a "bent pipe" systeml Satellites 14 route data packets received from CUs 12, CF 20, and other communication devices (not shown). Satellites 14 communicate with CF 20 over link 22.

CF 20 is a device which provides an interface between satellites 14 and a terrestrial telephony apparatus, such as PSTN 24, which provides telephone service to conventional telephone 26 and FCU 28. In a preferred embodiment, CF 20 includes a vocoder which enables CF 20 to decode encoded speech signals before sending the speech signals through PSTN 24 to conventional telephone 26. Because FCU 28 includes its own vocoder, the vocoder located within CF 20 does not need to decode the encoded speech signals destined for FCU 28. CF 20 is described in more detail in conjunction with FIG. 4.

As described above, in a preferred embodiment, a user's SCM table and input stimulus table are stored on a UIC. In an alternate embodiment, the SCM table and input stimulus table are stored in a CU memory device. In another alternate embodiment, CF 20 includes a memory device in which SCM tables and input stimulus tables are stored for registered users. During call setup, a CF that has the registered user's tables in storage sends the SCM table and input stimulus table to both the transmit vocoder and the receive vocoder.

FIG. 1 illustrates only a few of CUs 12, 28, satellites 14, CF 20, PSIN 24, and telephone 26 for ease of illustration. However, any number of CUs 12, 28, satellites 14, CFs 20, PSTNs 24, and telephones 26 may be used in a communication system.

Figure 2:
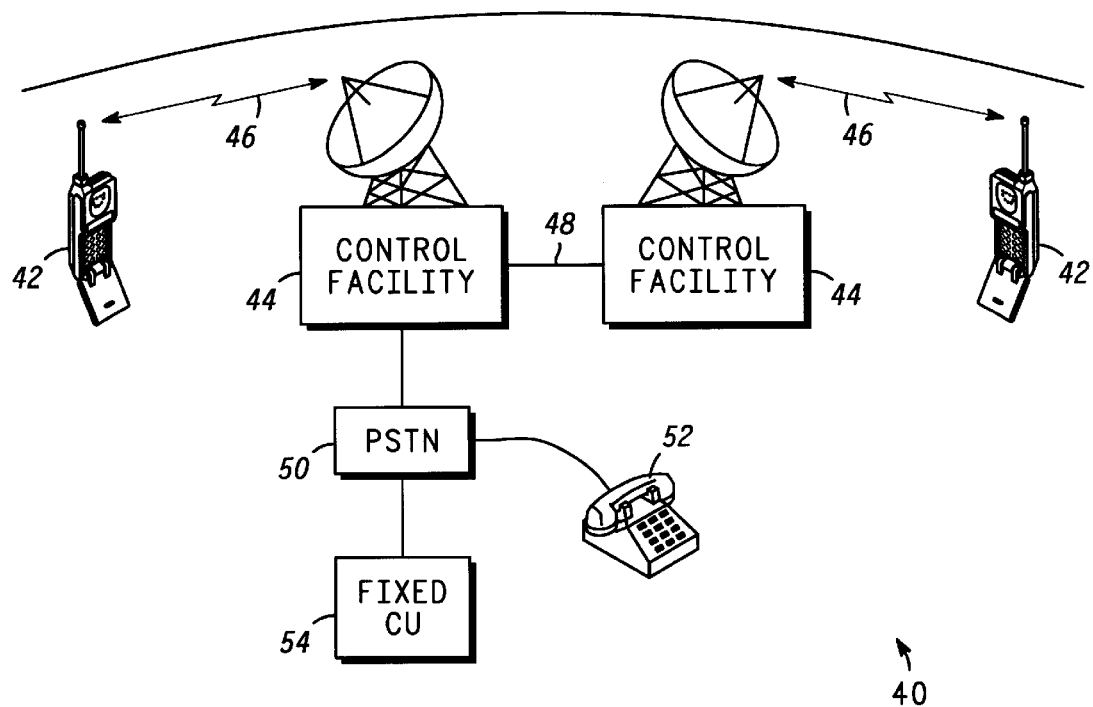
FIG. 2 illustrates a communication system in accordance with an alternate embodiment of the present invention.

FIG. 2 illustrates communication system 40 in accordance with an alternate embodiment of the present invention. Communication system 40 includes MCUs 42, CFs 44, PSTN 50, conventional telephone 52, and FCU 54. MCUs 42 can be, for example, cellular telephones or radios adapted to communicate with CFs 44 over RF links 46. CUs 42, 54 include a vocoder device for compressing speech data. In a preferred embodiment, CUs 42, 54 also include a UIC interface. CUs 42, 54 are described in more detail in conjunction with FIG. 3.

CF 44 is a device which provides an interface between MCUs 42 and a terrestrial telephony apparatus, such as PSTN 50 which provides telephone service to conventional telephone 52 and FCU 54. In addition, CF 44 can perform call setup functions, and other system control functions. In a preferred embodiment, CF 44 includes a vocoder which enables CF 44 to decode encoded speech signals before sending the speech signals through PSTN 50 to conventional telephone 52. Because FCU 54 includes its own vocoder, the vocoder located within CF 44 does not need to decode the encoded speech signals destined for FCU 54.

Multiple CFs 44 can be linked together using link 48 which may be an RF or hard-wired link. Link 48 enables CUs 42, 54 in different areas to communicate with each other. CF 44 is described in more detail in conjunction with FIG. 4. PATENT FIG. 2 illustrates only a few of CUs 42, 54, CFs 44, PSTN 50, and telephone 52 for ease of illustration. However, any number of CUs 42, 54, CFs 44, PSThs 50, and telephones 52 may be used in a communication system.

In an alternate embodiment, the systems of FIG. 1 and FIG. 2 can be networked together to allow communication between terrestrial and satellite-based RF communication systems.

Figure 3:
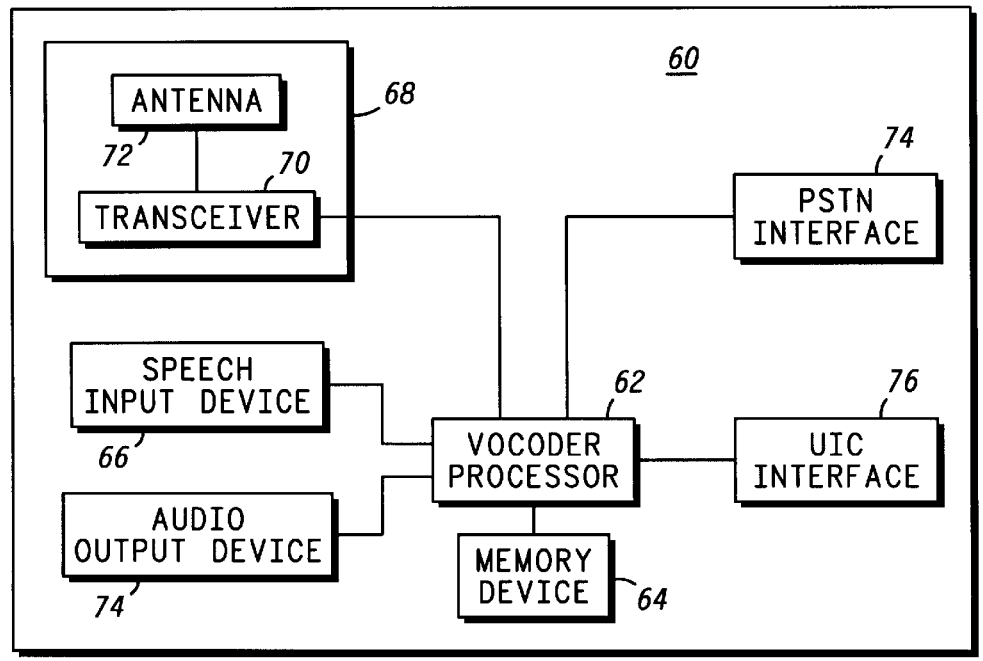
FIG. 3 illustrates a communication unit in accordance with a preferred embodiment of the present invention.

FIG. 3 illustrates CU 60 in accordance with a preferred embodiment of the present invention. CU 60 can be either an MCU (e.g., MCU 12, FIG. 1) or an FCU (e.g., FCU 28, FIG. 1). CU 60 includes vocoder processor 62, memory device 64, speech input device 66, and audio output device 74. Memory device 64 is used to store SCM tables and input stimulus tables for use by vocoder processor 62. Speech input device 66 is used to collect speech samples from the user of CU 60. Speech samples are encoded by vocoder processor 62 during a call, and also are used to generate the SCM tables and input stimulus tables during a training procedure. Audio output device 74 is used to output decoded speech.

In a preferred embodiment, CU 60 also includes UIC interface 76. As described previously, a user can insert or swipe a UIC through UIC interface 76, enabling the user's unique SCM table and input stimulus table to be loaded into memory device 64. In alternate embodiments, the user's unique SCM table and input stimulus table are pre-stored in memory device 64 or in a CF (e.g., CF 20, FIG. 1).

When CU 60 is an FCU, CU 60 further includes PSTN interface 74 which enables CU 60 to communicate with a PSTN (e.g., PSTN 24, FIG. 1). When CU 60 is an MCU, CU 60 further includes RF interface unit 68. RF interface unit 68 includes transceiver 70 and antenna 72, which enable CU 60 to communicate over an RF link (e.g., to satellite 14, FIG. 1). When a CU is capable of functioning as both an FCU and an MCU, the CU includes both PSTN interface 74 and RF interface 68.

Figures 4, 12:
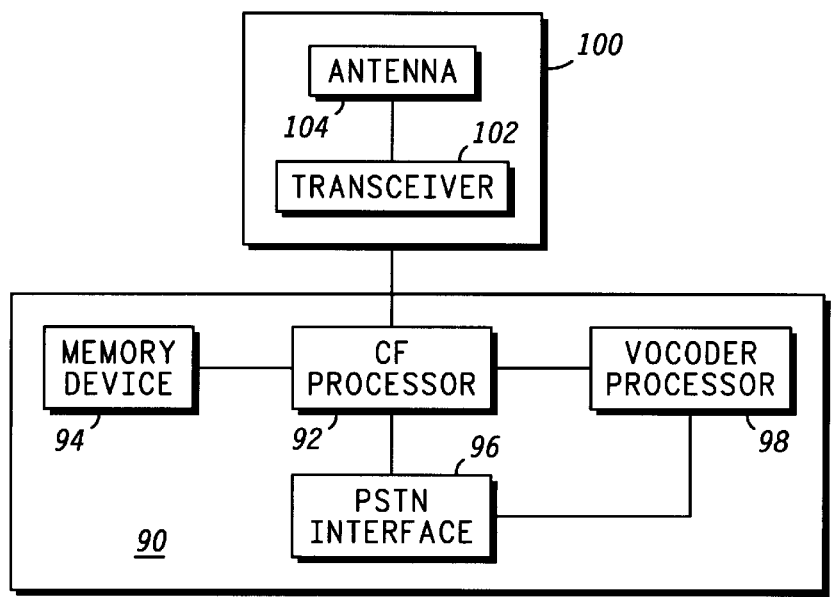
FIG. 4 illustrates a control facility in accordance with a preferred embodiment of the present invention.
FIG. 12 illustrates a vocoder portion of a User Information Card (UIC) in accordance with a preferred embodiment of the present invention.

FIG. 4 illustrates CF 90 (e.g., CF 20, FIG. 1) in accordance with a preferred embodiment of the present invention. CF 90 includes CF processor 92, memory device 94, PSTN interface 96, and vocoder processor 98. CF processor 92 performs the functions of call setup and telemetry, tracking, and control. Memory device 94 is used to store information needed by CF processor 92. In an alternate embodiment, memory device 94 contains SCM tables and input stimulus tables for registered users. When a call with a registered user is being set up, CF processor 92 sends the SCM tables and the input stimulus tables to the transmit CU and receive CU.

Vocoder processor 98 is used to encode and decode speech when a conventional telephone (e.g., telephone 26, FIG. 1) is a party to a call with a CU. When a call between a CU and an FCU (e.g., FCU 28, FIG. 1) is being supported, vocoder processor 98 can be bypassed as shown in FIG. 4. PSTN interface 96 allows CF processor 92 and vocoder processor 98 to communicate with a PSTN (e.g., PSTN 24, FIG. 1).

CF 90 is connected to RF interface 100 by a hard-wired, RF, or optical link. RF interface 100 includes transceiver 102 and antenna 104 which enable CF 20 to communicate with satellites (e.g., satellites 14, FIG. 1) or MCUs (e.g., MCUs 42, FIG. 2). RF interface 100 can be co-located with CF 90, or can be remote from CF 90.

The method of encoding and decoding speech in accordance with the present invention is described in FIGS. 5–9.

In one scenario, a CU user performs a training task (FIG. 5) prior to making a call. In another scenario, the training mode can be entered during call initialization (FIG. 6).

In a preferred embodiment, the training task is performed by the CU. In alternate embodiments, the training task can be performed by other devices (e.g., a CF). During the training task, speech data is collected from the user and an SCM table and an input stimulus table are created for that user. The SCM table and input stimulus table can be generated in a compressed or uncompressed form. The user is also given a user identification AD) number.

In a preferred embodiment, the user ID number, SCM table, and input stimulus table are stored on the user's UIC. In an alternate embodiment, this information is stored in a CU memory device (e.g., memory device 64, FIG. 3). In another alternate embodiment, the information is sent to a CF (e.g., CF 20, FIG. 1) and stored in a CF memory device (e.g., memory device 94, FIG. 4).

Figure 6:
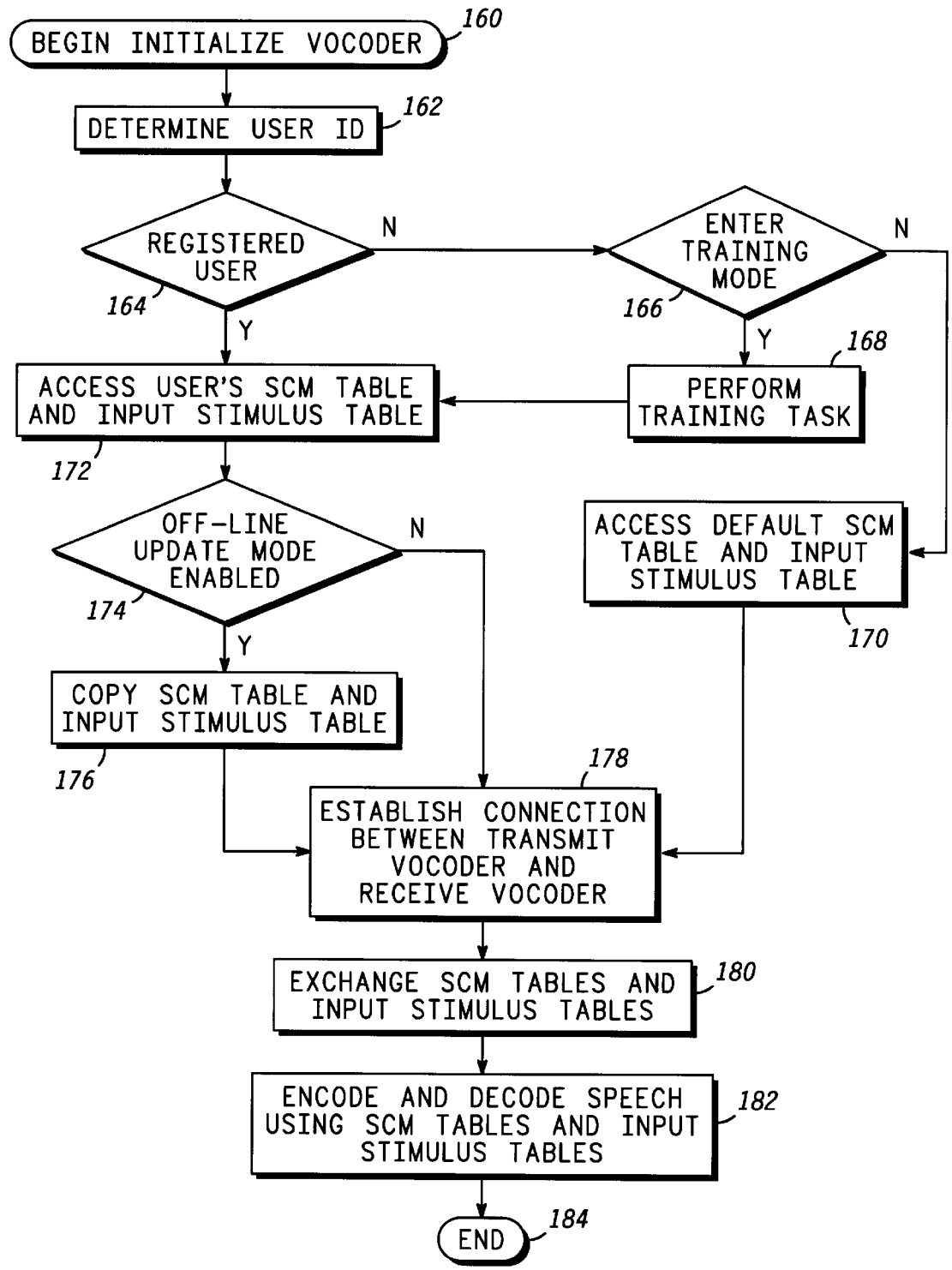
FIG. 6 illustrates a flowchart of a method of initializing transmit and receive vocoders in accordance with a preferred embodiment of the present invention.

During call setup, the vocoders of the transmit CU and the receive CU are initialized (FIG. 6). This includes exchanging SCM tables and input stimulus tables for the calling and the called users. After initialization, speech is encoded (FIG. 7) and decoded (FIG. 9) using the SCM tables and the input stimulus tables.

Figure 5:
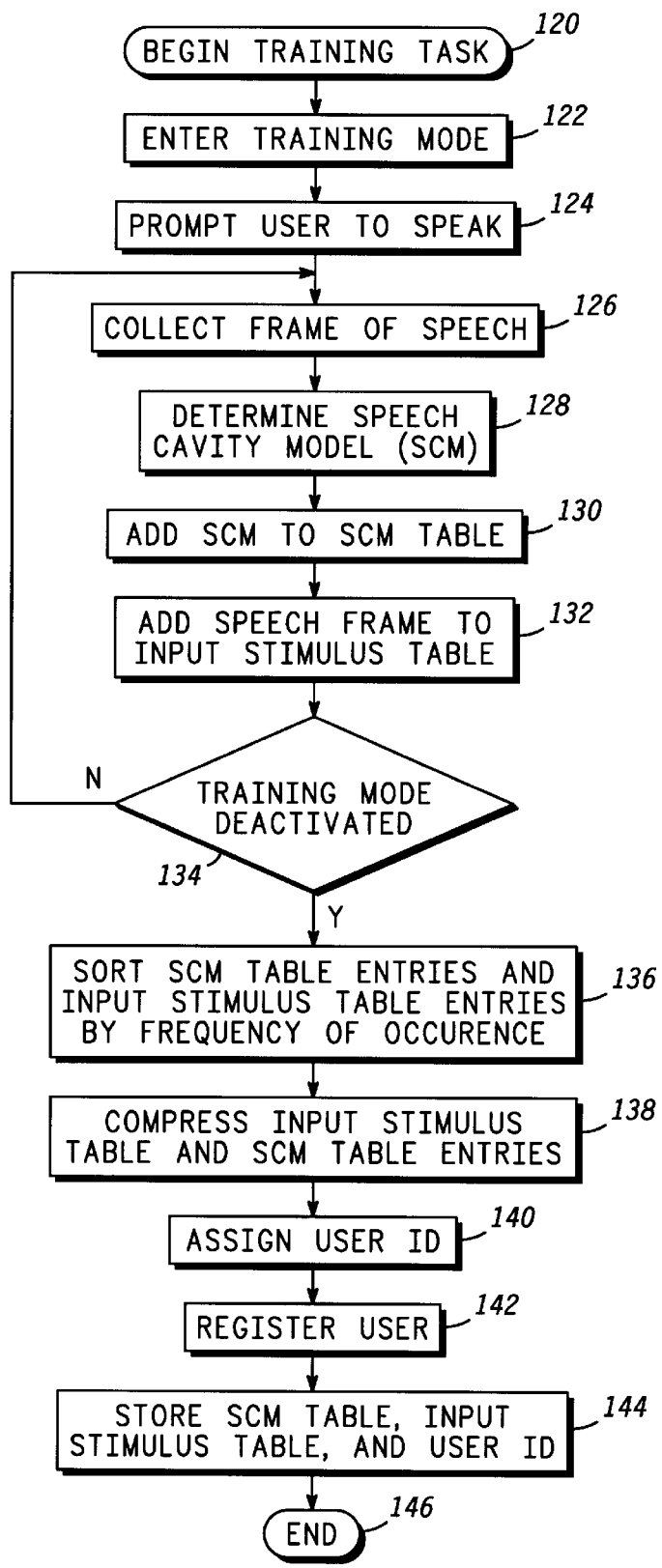
FIG. 5 illustrates a flowchart of a training task in accordance with a preferred embodiment of the present invention.

Each of these processes will now be described in detail. FIG. 5 illustrates a flowchart of the training task in accordance with a preferred embodiment of the present invention. The training task is either performed before a call attempt is made, or is performed during vocoder initialization (FIG. 6). The training task begins 120 when the training mode is entered in step 122. The training mode can be entered, for example, when the user executes a series of keypresses to reach the training mode. These keypresses can be accompanied by display messages from the CU designed to lead the user through the training mode.

Once the training mode is entered, the CU prompts the user to speak in step 124. For example, the user can be requested to repeat a predetermined sequence of statements. The statements can be designed to cover a broad range of sounds. Alternatively, the user can be requested to say anything that the user wishes. As the user speaks, step 126 collects a frame of speech data. A frame of speech data is desirably a predetermined amount of speech (e.g., 30 msec) in the form of digital samples. The digital samples are collected by a speech input device (e.g., speech input device 66, FIG. 3) which includes an analog-to-digital converter that converts the analog speech waveform into the sequence of digital samples.

After a frame of speech is collected, an SCM for the speech frame is determined in step 128. The SCM is a representation of the characteristics of the speech. Methods of determining speech characteristics are well known to those of skill in the art The SCM is added to the SCM table in step 130. The SCM table contains a list of SCMs obtained from the user's speech frames. Each of the SCM entries represent different characteristics of the user's speech. The size of the SCM table is somewhat arbitrary. It should be large enough to provide a representative range of SCMs, but should be small enough that the time required to search the SCM table is not unacceptably long.

In a preferred embodiment, each SCM table entry has an associated counter which represents the number of times the same or a substantially similar SCM has occurred during the training task. Each new SCM is analyzed to determine whether it is substantially similar to an SCM already in the SCM table. When the new SCM is substantially similar to an existing SCM, the counter is incremented. Thus, the counter indicates the frequency of each SCM entry. In a preferred embodiment, this information is used later in the sorting step 136 and the compressing step 138.

The speech frame is added to the input stimulus table in step 132. The input stimulus table contains a list of input stimulus from the user. The input stimulus can be raw or filtered speech data. Similar to the SCM table, the size of the input stimulus table is arbitrary. In a preferred embodiment, a counter is also associated with each input stimulus table entry to indicate the fiequency of substantially similar input stimuli occurring.

A determination is made in step 134 whether the training mode is deactivated. The training mode can be deactivated automatically by the CU (e.g., after a certain period of time or when the user stops speaking), or it can be deactivated by the user through a series of keypresses. When the training mode is not deactivated, the process iterates as shown in FIG. 5.

In a preferred embodiment, when the training mode is deactivated, step 136 sorts the SCM table entries and the input stimulus table entries by frequency of occurrence. As indicated by the SCM and input stimulus counters associated with each entry, the more frequently occurring table entries will be placed higher in the respective tables. In an alternate embodiment, the SCM table entries and input stimulus table entries are left in an order that does not indicate the frequency of occurrence.

In a preferred embodiment, the input stimulus table entries and SCM table entries are then compressed in step 138. For example, using the well-known Hufftnan compression technique, the frequency statistics can be used to develop a set of transmission codewords for the input stimuli and SCMs, where the most frequently used stimuli and SCMs have the shortest transmission codewords. The purpose for compressing the input stimulus table entries is to minimize the number of bits that need to be sent to the receive vocoder during the update task.

In step 140, the user is assigned a user ID number. The user ID number can be selected by the CU or by the user through a series of keypresses. The user is then considered registered in step 142.

Finally, the SCM table, input stimulus table, and user ID are stored in step 144. In a preferred embodiment, they are stored on the user's UIC. Storing the information on the UIC allows rapid access to the information without using the CU's memory storage space. The user can remove the UIC from the CU and carry the UIC just as one would carry a credit card. The UIC can also contain other information the user needs to use a CU. In an alternate embodiment, the information can be stored in the CU's memory storage device (e.g., memory device 64, FIG. 3). In another alternate embodiment, the CU can send the SCM table and the input stimulus table through the communication system to a control facility (e.g., CF 20, FIG. 1). When the tables are needed (i.e., during vocoder initialization), they are sent to the transmit vocoder and the receive vocoder. Information for one or more users can be stored on a UIC, in the CU, or at the CF. The training task ends in step 146.

The order of execution of the steps shown in FIGS. 5–9 can be altered without detracting from the present invention. For example, steps 140 and 142 can occur at almost any time during the training task, and the order of steps 128–132 can be different. Thus, the orders of the steps shown in FIGS. 5–9 are for the purpose of illustration and not of limitation.

FIG. 6 illustrates a flowchart of a method of initializing transmit and receive vocoders in accordance with a preferred embodiment of the present invention. A transmit or receive vocoder can exist in a CU or in a CF (e.g., when a conventional telephone is a party to the call). The method begins 160 by determining the user ID of the transmit CU user in step 162. The user ID can be determined by reading a specific memory location on a UIC, or by prompting the user to input the user ID. When a UIC containing the input stimulus table and SCM table is not used, a determination is made in step 164 whether the user ID indicates that the user is registered. In a preferred embodiment, the user ID is compared to a list of registered users within the CU. In an alternate embodiment, the user ID is sent to a CF (e.g., CF 20, FIG. 1) and compared with a list of registered users stored within the CF. When the CF determines that the CU user is not on the list of registered users, the CF sends a message to the CU indicating that the CU user is not registered.

When the user is not registered, a determination is made whether to enter the training mode in step 166. In a preferred embodiment, the CU asks the user whether he or she wants to enter the training mode. In an alternate embodiment, the training mode is automatically entered when a user is not registered When the user indicates that he or she does not wish to enter the training mode, the CU accesses a default SCM table and a default input stimulus table in step 170. The default tables desirably include entries which accurately model a wide range of speech. When the user indicates that he or she does want to enter the training mode, the training task is performed in step 168 in accordance with FIG. 5. When the user is registered (step 164) or the training task is completed (step 168), the user's SCM table and input stimulus table are accessed in step 172. In the embodiment where the CF stores the user's tables and the user was not previously registered, the CU sends the user's tables to the CF during step 172.

In a preferred embodiment, a user is given the option whether to update the user's SCM table and input stimulus table during the call. The table update can be performed concurrently with the call by modifying table entries used during that call ("concurrent update mode"). In the concurrent update mode, the modified table entries are sent to the receiving vocoder during the call. Alternatively, the table update can be performed after the call is completed ("off-line update mode"). In the off-line update mode, copies of the tables are made prior to the call. The copies are modified during the call, and the modified tables are used to replace the stored tables in the transmitting CU or the CF at the end of the call. The table copies are made during vocoder initialization.

Referring again to FIG. 6, the CU determines in step 174 whether the off-line update mode is enabled. In a preferred embodiment, the off-line update mode is enabled by the user. In an alternate embodiment, the off-line update mode can be enabled automatically. When the off-line update mode is enabled, copies of the user's SCM table and input stimulus table are made in step 176. The off-line update mode is described in more detail in conjunction with FIG. 7 (step 216) and FIG. 8.

When the off-line update mode is not enabled (step 174) or after the table copies have been made (step 176), a connection is established between the transmit vocoder and the receive vocoder in step 178. SCM tables and input stimulus tables are exchanged in step 180. Once initialization is complete, in step 182, the vocoders then encode and decode speech using the exchanged SCM tables and input stimulus tables. Encoding and decoding are described in detail in conjunction with FIGS. 7 and 9. The procedure then ends in step 184.

Figure 7:
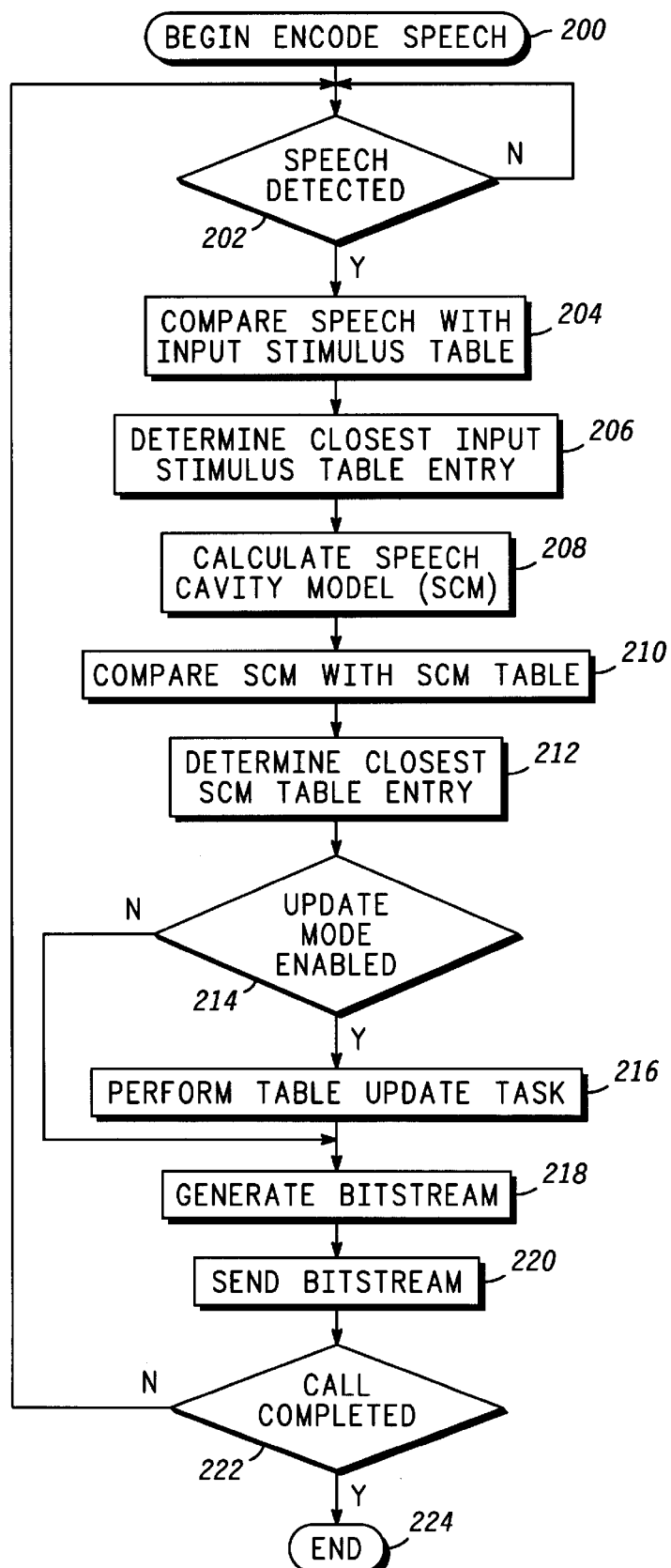
FIG. 7 illustrates a flowchart of a method of encoding speech in accordance with a preferred embodiment of the present invention.

FIG. 7 illustrates a flowchart of a method of encoding speech in accordance with a preferred embodiment of the present invention. The method begins 200 when a determination is made in step 202 whether speech is detected by the transmit vocoder. When speech is not detected, the vocoder waits. When speech is detected, a speech frame is collected and compared with entries from the user's input stimulus table in step 204.

For example, a least squares error measurement between a speech frame and each input stimulus table entry can yield error values that indicate how close a fit each input stimulus table entry is to the speech frame. Other comparison techniques can also be applied. As described previously, in a preferred embodiment, the input stimulus table entries are stored in a compressed form. The speech frame and the input stimulus table entries should be compared when both are in a compressed or an uncompressed form.

In step 206, a determination is made of which input stimulus table entry most closely matches the speech frame. The closest entry is, for example, the entry having a smallest least squares error. When the input stimulus table entries have been previously sorted (step 136, FIG. 5), the entire table need not be searched to find a table entry that is sufficiently close to the speech flame. Table entries need only be evaluated until the comparison yields an error that is within an acceptable limit. The CU then desirably stores the index to the closest input stimulus table entry.

Next, an SCM is calculated for the speech frame in step 208. As described previously, the SCM can be calculated by using vocoder techniques common to those of skill in the art. The SCM is compared with the user's SCM table entries in step 210. The comparison can be, for example, a determination of the least squares error between the SCM and each SCM table entry. In step 212, the most closely matched SCM table entry is determined. The closest SCM table entry is the entry having the smallest error. When the SCM table entries have been previously sorted (step 136, FIG. 5), the entire table need not be searched to find a table entry that is sufficiently close to the SCM. Table entries need only be evaluated until the comparison yields an error that is within an acceptable limit. The CU then desirably stores the index to the closest SCM table entry.

Next, a determination is made whether the update mode is enabled in step 214. When the update mode is enabled, the table update task is performed in step 216. As described previously, the table update task is either a concurrent update mode or an offline update mode. The off-line update mode has been previously initialized in step 174, FIG. 5. The table update task is described in detail in conjunction with FIG. 8.

When the update mode is not enabled (step 214), or after the update task has been performed (step 216), a bitstream is generated in step 218. In a preferred embodiment, the bitstream contains the closest SCM index and the closest input stimulus index. Typically, the bitstream also includes error control bits to achieve a required bit error ratio for the channel. Once the bitstream is generated, it is sent in step 220 to the receive vocoder. A determination is made whether the call is completed in step 222. If not, the procedure iterates as shown in FIG. 7. If so, the procedure ends in step 224.

Figure 8:
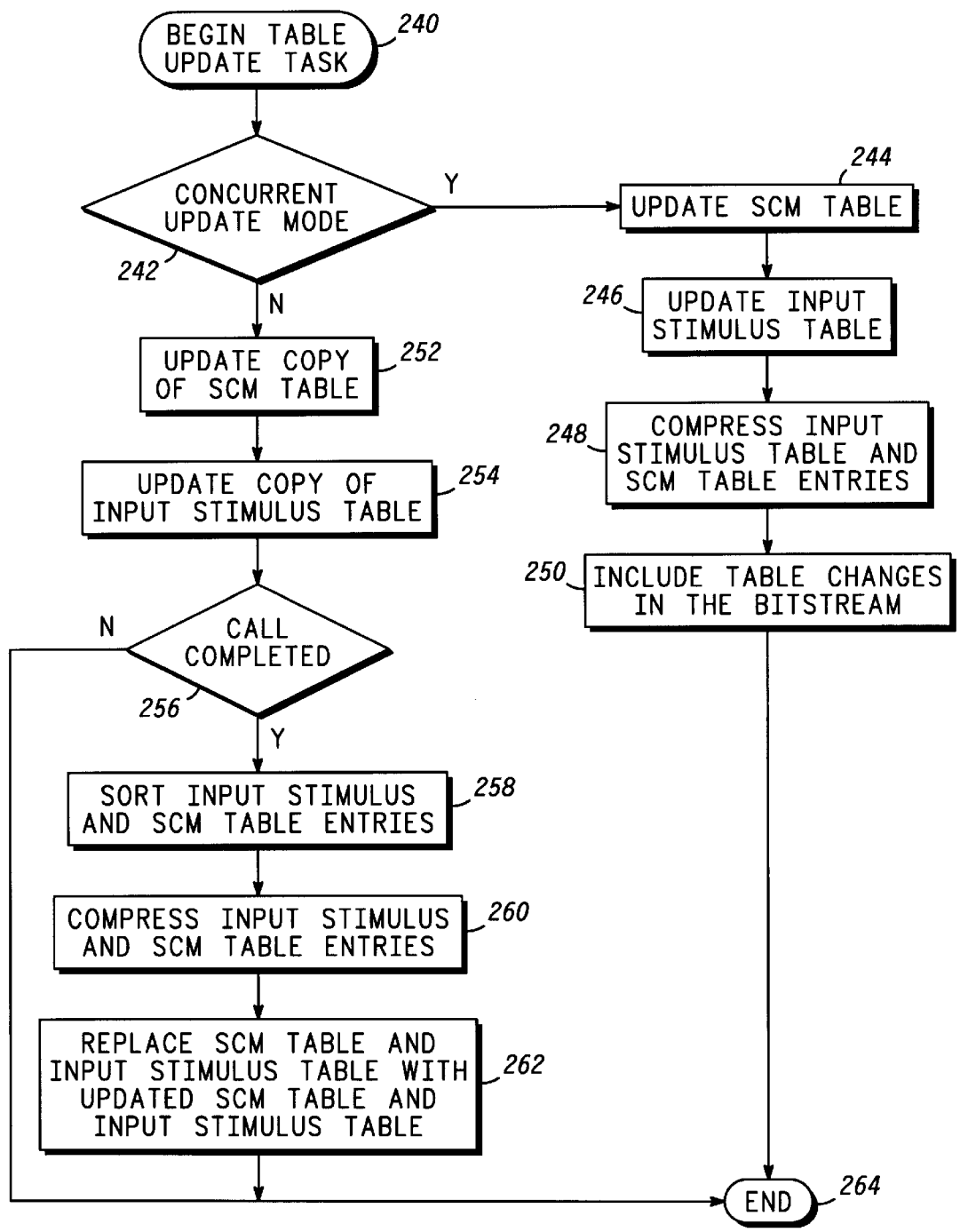
FIG. 8 illustrates a flowchart of a method of updating a speech characteristic model table and an input stimulus table in accordance with a preferred embodiment of the present invention.

FIG. 8 illustrates a flowchart of a method of updating (step 216, FIG. 7) an SCM table and an input stimulus table in accordance with a preferred embodiment of the present invention. The method begins 240 when a determination is made in step 242 whether the CU is using the concurrent update mode. If so, the SCM table being used during the call is updated in step 244. The table is updated by comparing the SCM from the speech frame with the SCM table entries. When the SCM is substantially the same as any entry, the entry's counter is incremented and the SCM table is resorted, if necessary. When the SCM is not substantially the same as any entry, the SCM can replace an SCM table entry having a low incidence of occurrence. The input stimulus table is updated in step 246 in a similar fashion. In a preferred embodiment, the new entries are then compressed in step 248. In step 250, the compressed, updated entries, if any, are included as part of the bitstream that is generated (step 218, FIG. 7) and sent (step 220, FIG. 7) to the receive vocoder. The procedure then ends in step 264.

When the CU is not using the concurrent update mode (step 242) (i.e., the CU is using the off-line update mode), the copy of the SCM table that was made during the vocoder initialization task (step 176, FIG. 6) is updated in step 252. Similarly, the copy of the input stimulus table is updated in step 254. The updated entries can then be compressed. In a preferred embodiment, however, compression is performed after the call is completed (step 260).

In step 256, a determination is made whether the call is completed. If not, the procedure ends in step 264. If so, the input stimulus table entries and the SCM table entries are sorted in step 258 according to the frequency of occurrence of each entry. In a preferred embodiment, the input stimulus table entries and SCM table entries are then compressed in step 260 as described previously. In step 262, the user's old SCM table and input stimulus table are replaced with the updated SCM table and input stimulus table for use during the next call by the user. The tables are replaced on either the UIC, within the CU, or at the CF. The procedure then exits in step 264 and resumes at step 218, FIG. 7.

Figure 9:
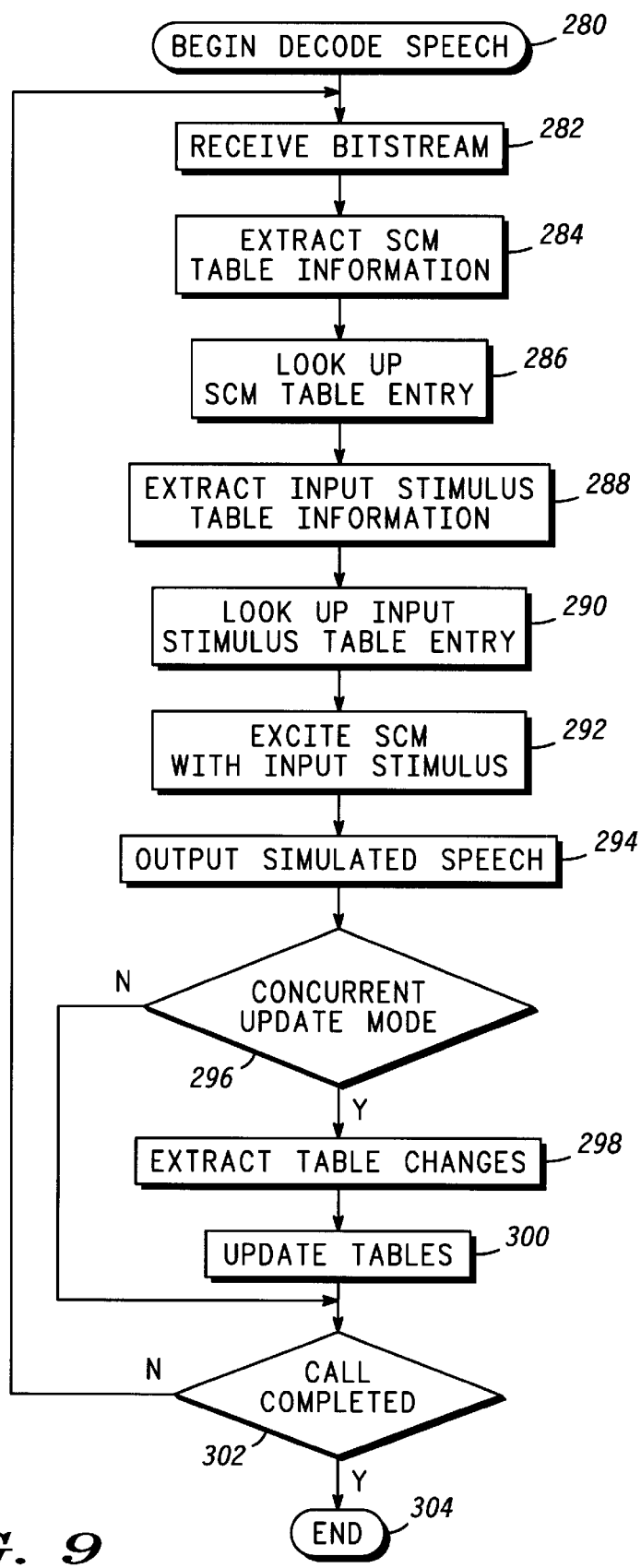
FIG. 9 illustrates a flowchart of a method of decoding speech in accordance with a preferred embodiment of the present invention.

FIG. 9 illustrates a flowchart of a method of decoding speech in accordance with a preferred embodiment of the present invention. As was described previously, the user's SCM table and input stimulus table were previously sent to the receive vocoder. The method begins 280 when a portion of a bitstream is received in step 282. The SCM information is extracted from the bitstream in step 284. In a preferred embodiment, the SCM information is the closest index into the SCM table. This index is used to look up the SCM table entry for the transmit vocoder user in step 286.

The input stimulus information is then extracted from the bitstream in step 288. In a preferred embodiment, the input stimulus information is the closest index into the input stimulus table. This index is used to look up the input stimulus table entry for the transmit vocoder user in step 290.

In step 292, an uncompressed version of the closest SCM table entry, which models the transmit vocoder user's vocal tract, is excited with the input stimulus table entry. This produces a frame of simulated speech which is output in step 294 to an audio output device (e.g., audio output device 74, FIG. 3).

A determination is made in step 296 whether the concurrent update mode was enabled by the transmit vocoder user. If so, table changes are extracted from the bitstream in step 298. These changes are used to update the receive vocoder's SCM table and the input stimulus table in step 300. After the updates are made, or when the concurrent update mode is not enabled (step 296), a determination is made whether the call is complete in step 302. If not, the procedure iterates as shown in FIG. 9. If so, the procedure ends in step 304.

In order to reduce size and computational requirements of a CU, many of the steps performed by a CU as described in FIGS. 5–9 can be performed remotely by a CF or other device in alternate embodiments.

Examples of SCM and input stimulus tables are shown in FIGS. 10 and 11. FIG. 10 illustrates SCM table 320 in accordance with a preferred embodiment of the present invention. As described previously, SCM table 320 can be stored on a UIC, within a CU, or in a CF memory device. SCM table 320 has user ID column 322, entry index column 324, and speech characteristic parameters column 326. Where an SCM table for only one user is stored, user ID column 322 is not necessary. The values shown in each of the columns 322–326 are for exemplary purposes only.

SCM table entries for a first user are shown in rows 328, for a second user in rows 330, and for a third user in rows 332. As illustrated in FIG. 10, multiple entries are stored for each user as indicated by the entry index column 324. The number of entries stored depends on the vocoder. When more entries are stored, the speech quality may be enhanced, but more time to search the table and more memory is required. When fewer entries are stored, the table takes less time to search and less memory is required, but the speech quality may be lower. The speech characteristic parameters in each entry represent an SCM of the user's speech. As described previously, the SCMs are derived using common vocoding techniques. Where a Huffman coding technique is used to compress the table entries, the most frequently occurring entries will be of a shorter length.

FIG. 11 illustrates input stimulus table 340 in accordance with a preferred embodiment of the present invention. As described previously, input stimulus table 340 can be stored on a UIC, within a CU, or in a CF memory device. Input stimulus table 340 has user ID column 342, entry index column 344, and stimulus samples column 346. Where an input stimulus table for only one user is stored, user ID column 342 is not necessary. The values shown in each of the columns 342–346 are for exemplary purposes only.

Input stimulus table entries for a first user are shown in rows 348, for a second user in rows 350, and for a third user in rows 352. As illustrated in FIG. 11, multiple entries are stored for each user as indicated by the entry index column 344. As with the SCM table, the number of entries stored depends on the vocoder. The stimulus samples in each entry can be filtered or unfiltered samples of speech obtained from the user. Where a Huffman coding technique is used to compress the table entries, the most frequently occurring entries will be of a shorter length.

In a preferred embodiment, each user's SCM table and input stimulus table are stored on a UIC. FIG. 12 illustrates vocoder portion 360 of a UIC in accordance with a preferred embodiment of the present invention. SCM tables and input stimulus tables for one or more users can be stored on a UIC. FIG. 11 shows an SCM table and an input stimulus table for one user. Address column 362 represents exemplary addresses where the user information can be stored. Vocoder data column 364 contains the user ID information 366, SCM table 368, and input stimulus table 370 for the user.

The locations of the user ID 366, SCM entries 368, and input stimulus entries 370 in the UIC are arbitrary. The addresses shown in FIG. 12 are in hexadecimal format and are for purposes of illustration only. Address 0000 points to the user ID field 366 which contains the user ID number for a particular user. Addresses 0001 through 0021 contain SCM table entries 368. Addresses 1000 through 1020 contain input stimulus table entries 370. In a preferred embodiment, an index number is associated with each SCM and input stimulus table entry as shown in FIGS. 10 and 11. Where vocoder information for multiple users is stored on a UIC, multiple data fields as shown in FIG. 12 will exist on the UIC.

In summary, a vocoder method and apparatus have been described which provide high quality speech at low bit rates by using pre-stored user-unique SCM information and user-unique input stimulus information. Access to the user-unique information from a UIC or a memory device in a CU or a CF enhances the quality of characterization of a user's speech. In addition, because both the transmit and receive vocoders have access to the tables, less information about the user's speech needs to be sent to the receive vocoder, thus, reducing the bit rate.

What is claimed is:

1. A method for encoding and decoding speech during a call between a speech encoder for a first communication unit and a speech decoder for a second communication unit, the method comprising the steps of:
   a) accessing, by the first communication unit, user-unique speech encoding information for a user of the first communication unit, wherein the user-unique speech encoding information is used to encode input speech of the user but not used to encode input speech of a user of the second communication unit;
   b) establishing a connection between the first communication unit and the speech decoder;
   c) encoding, by the speech encoder, input speech frames by determining closest entries of the user-unique speech encoding information; and
   d) sending information describing the closest entries to the speech decoder.

2. The method as claimed in claim 1, wherein the user-unique speech encoding information comprises a speech characteristic model (SCM) table and an input stimulus table, and the step a) of accessing the user-unique speech encoding information comprises the steps of:
   a1) accessing the SCM table for the user, where the SCM table contains most common SCMs associated with the user; and
   a2) accessing the input stimulus table for the user, where the input stimulus table contains most common input stimulus associated with the user,
and wherein the step d) of encoding the input speech frames comprises the step of using the SCM table and the input stimulus table to encode the input speech frames.

3. The method as claimed in claim 2, further comprising the steps performed before step a) of:
   f) collecting training speech frames of input speech data from the user,
   g) determining the most common SCMs from the training speech fames;
   h) storing the most common SCMs in the SCM table; and
   i) storing the most common input stimulus from the training speech frames in the input stimulus table.

4. The method as claimed in claim 2, wherein the step a1) of accessing the SCM table comprises the step of reading the SCM table from a user information card inserted into the first communication unit, and the step a2) of accessing the input stimulus table comprises the step of reading the input stimulus table from the user information card.

5. The method as claimed in claim 2, further comprising the step of:
   f) updating the SCM table and the input stimulus table during the call with new SCM table entries and new input stimulus table entries derived from the input speech frames.

6. The method as claimed in claim 5, wherein the step f) of updating comprises the steps of:
   f1) compressing the new SCM table entries and the new input stimulus table entries; and
   f2) sending compressed, new SCM table entries and compressed, new input stimulus table entries to the speech decoder.

7. The method as claimed in claim 1, further comprising the step of:
   f) obtaining a user identification number for the user; and
   g) using the user identification number to access the user-unique speech encoding information.

8. A method for encoding and decoding speech during a call between a speech encoder for a first communication unit and a speech decoder for a second communication unit, the method comprising the steps of:
   a) receiving, by the first communication unit, an input speech frame spoken by a communication unit user;
   b) determining a closest input stimulus table entry by comparing the input speech frame with at least one input stimulus table entry contained in an input stimulus table for the communication unit user, wherein the at least one input stimulus table entry were created before the call, and the at least one input stimulus table entry is used to encode input speech of the user but not used to encode input speech of a user of the second communication unit;
   c) calculating a speech characteristic model (SCM) from the input speech frame;
   d) determining the closest SCM table entry by comparing the SCM with an SCM table containing at least one SCM table entry for the communication unit user, wherein the at least one SCM table entry were created before the call;
   e) generating a bitstream that includes information identifying the closest input stimulus table entry and the closest SCM table entry; and
   f) sending the bitstream to the speech decoder.

9. The method as claimed in claim 8, further comprising the steps, performed prior to step a) of:
   g) sending, by the first communication unit, the input stimulus table and the SCM table for the communication unit user to the speech decoder;
   h) receiving, by the speech decoder, the input stimulus table and the SCM table; and
   i) storing the input stimulus table and the SCM table in a memory device accessible to the speech decoder.

10. The method as claimed in claim 9, further comprising the steps of:
   j) receiving the bitstream by the speech decoder,
   k) extracting the information identifying the closest input stimulus table entry and the closest SCM table entry from the bitstream;
   l) looking up the closest SCM table entry in the SCM table using the information;
   m) looking up the closest input stimulus table entry in the input stimulus table using the information;
   n) exciting the closest SCM table entry with the closest input stimulus table entry, resulting in a simulated speech frame; and
   o) outputting the simulated speech frame to an audio output device.

11. The method as claimed in claim 8, further comprising the steps performed before step a) of:
   g) determining an identification number of the communication unit user;
   h) sending a message containing the identification number to a control facility;
   i) reading the SCM table and the input stimulus table for the identification number from a memory device accessible to the control facility; and
   j) sending the SCM table and the input stimulus table for the identification number to the first communication unit.

12. The method as claimed in claim 11, further comprising the steps of:
   k) determining whether the communication unit user is one of a set of registered users, where a registered user is a user that has a user-unique SCM table and a user-unique input stimulus table prestored in the memory device; and
   l) when the communication unit user is not in the set of registered users, sending a message to the first communication unit indicating that the communication unit user is not in the set of registered users.

13. The method as claimed in claim 11, further comprising the steps of:
   k) sending the SCM table and the input stimulus table for the identification number to the speech decoder.

14. The method as claimed in claim 8, further comprising the steps performed before step a) of:
   g) determining an identification number of the communication unit user; and
   h) reading the SCM table and the input stimulus table for the communication unit user from a memory device.

15. The method as claimed in claim 14, wherein the memory device is a user information card and the step g) of determining the identification number comprises the step of reading the identification number from the user information card.

16. The method as claimed in claim 14, further comprising the steps of:
   i) determining, from the identification number, whether the communication unit user is one of a set of registered users, a registered user is a user that has a user-unique SCM table and a user-unique input stimulus table prestored in the memory device;
   j) when the communication unit user is not in the set of registered users, reading a default SCM table and a default input stimulus table from the memory device; and
   k) using the default SCM table and the default input stimulus table as the SCM table and the input stimulus table.

17. The method as claimed in claim 14, further comprising the steps of:
   i) determining, from the identification number, whether the communication unit user is one of a set of registered users, where a registered user is a user that has a user-unique SCM table and a user-unique input stimulus table prestored in the memory device;
   j) when the communication unit user is not in the set of registered users, registering the communication unit user by assigning a new user identification number and creating a new SCM table and a new input stimulus table for the communication unit user, and
   k) using the new SCM table and the new input stimulus table as the SCM table and the input stimulus table.

18. The method as claimed in claim 17, wherein the step j) of registering comprises the steps of:
   j1) assigning the new user identification number to the communication unit user;
   j2) collecting frames of input speech data from the communication unit user;
   j3) determining speech characteristic models from the frames;
   j4) storing most common models of the speech characteristic models in the new SCM table; and
   j5) storing most common input stimulus from the frames in the new input stimulus table.

19. The method as claimed in claim 8, further comprising the steps performed before step a) of:
   g) assigning a new user identification number to the communication unit user;
   h) collecting frames of input speech data from the communication unit user;
   i) determining speech characteristic models from the frames;
   j) storing most common models of the speech characteristic models in the SCM table; and
   k) storing most common input stimulus from the frames in the input stimulus table.

20. The method as claimed in claim 19, further comprising the step of:
   l) updating the SCM table and the input stimulus table during the call with new SCM table entries and new input stimulus table entries derived from the frames of speech data.

21. The method as claimed in claim 20, wherein the step l) of updating comprises the steps of:
   l1) compressing the new SCM table entries and the new input stimulus table entries; and
   l2) sending compressed, new SCM table entries and compressed, new input stimulus table entries to the speech decoder.

22. A method for encoding and decoding speech between a speech encoder for a first communication unit and a speech decoder for a second communication unit, the method comprising the steps of:
   a) receiving, by the first communication unit, an input speech frame from a known user;
   b) determining a first index to a closest input stimulus table entry by comparing the input speech frame with an input stimulus table containing at least one input stimulus entry for the known user, wherein the at least one input stimulus table entry is used to encode input speech of the known user but not used to encode input speech of a user of the second communication unit;
   c) calculating a speech characteristic model (SCM) from the input speech frame;
   d) determining a second index to a closest SCM table entry by comparing the SCM with at least one SCM table entry contained in an SCM table for the known user,. wherein the at least one SCM table entry is used to encode input speech of the known user but not used to encode input speech of the user of the second communication unit;
   e) generating a bitstream that includes the first index and the second index; and
   f) sending the bitstream to the speech decoder.

23. A method for encoding and decoding speech during a call between a speech encoder for a first communication unit and a speech decoder for a second communication unit, the method comprising the steps of:

b) collecting frames of input speech data from the communication unit user;

c) determining speech characteristic models from the frames;

d) storing most common models of the speech characteristic models in a user-unique speech characteristic model (SCM) table;

e) storing most common input stimulus from the frames in a user-unique input stimulus table;

f) establishing a connection between the first communication unit, which is used by the communication unit user, and the speech decoder;

g) receiving an input speech frame from the communication unit user;

h) determining a closest input stimulus table entry by comparing the input speech frame with the user-unique input stimulus table;

i) calculating an SCM from the input speech frame;

j) determining a closest SCM table entry by comparing the SCM with the most common models in the user-unique SCM table;

k) generating a bitstream that includes information identifying the closest input stimulus table entry and the closest SCM table entry;

l) sending the bitstream to the speech decoder; and m) repeating steps g) through m) for a duration of the call.

24. The method as claimed in claim 23, wherein step d) comprises the step of storing the user-unique input stimulus table in a user information card, step e) comprises the step of storing the user-unique SCM table in the user information card, and the method further comprises the step of storing a user identification number in the user information card.

25. The method as claimed in claim 23, further comprising the steps of:

n) updating the user-unique SCM table with the SCM calculated in step i);

o) updating the user-unique input stimulus table with the input speech frame; and p) sending changes to the user-unique SCM table and the user-unique input stimulus table to the speech decoder.

26. The method as claimed in claim 23, further comprising the steps of:

n) creating an SCM table copy and an input stimulus table copy before a first performance of step g);

o) updating the SCM table copy with the SCM calculated in step i);

p) updating the input stimulus table copy with the input speech frame; and q) after completion of the call between the first communication unit and the second communication unit, replacing the user-unique SCM table with the SCM table copy and replacing the user-unique input stimulus table with the input stimulus table copy.

27. A communication unit apparatus comprising:

a speech input device for receiving input speech frames;

a processor coupled to the speech input device for establishing a connection between a speech encoder for the communication unit apparatus and a speech decoder for a second communication unit, and for encoding the input speech frames by determining closest entries in user-unique encoding information tables for the input speech frames, wherein the user-unique encoding information tables contain encoding information for a known user, and the user-unique encoding information tables are used to encode input speech of the known user but not used to encode input speech frames of a user of the second communication unit; and a transceiver coupled to the processor for sending information describing the closest entries to the speech decoder.

28. The communication unit apparatus as claimed in claim 27, further comprising:

a user information card interface coupled to the processor for reading the user identification number from a user information card (UIC) inserted into the communication unit apparatus, for accessing the user-unique encoding information tables stored on the UIC for the user identification number.

29. The communication unit apparatus as claimed in claim 27, further comprising:

a memory device coupled to the processor for storing the user-unique encoding information tables for the user identification number.

30. The communication unit apparatus as claimed in claim 27, wherein the transceiver comprises:

a receiving unit for receiving the user-unique encoding information tables from a control facility.

* * * * *